United States Patent
Nishi et al.

(10) Patent No.: US 8,859,072 B2
(45) Date of Patent: Oct. 14, 2014

(54) CUT-OUT SINTERED CERAMIC SHEET AND METHOD OF MANUFACTURING THE SAME

(71) Applicant: Maruwa Co., Ltd., Owariasahi (JP)

(72) Inventors: Ikuo Nishi, Joetsu (JP); Sei Kanbe, Owariasahi (JP)

(73) Assignee: Maruwa Co., Ltd., Owariasahi, Aichi (JP)

( * ) Notice: Subject to any disclaimer, the term of this patent is extended or adjusted under 35 U.S.C. 154(b) by 0 days.

(21) Appl. No.: 13/767,116

(22) Filed: Feb. 14, 2013

(65) Prior Publication Data

US 2013/0156996 A1   Jun. 20, 2013

Related U.S. Application Data

(62) Division of application No. 13/649,454, filed on Oct. 11, 2012.

(30) Foreign Application Priority Data

Nov. 11, 2011  (JP) .................................. 2011-248110
Jul. 19, 2012   (WO) ................. PCT/JP2012/004604

(51) Int. Cl.
  | | |
  |---|---|
  | *B32B 3/02* | (2006.01) |
  | *B32B 27/00* | (2006.01) |
  | *B32B 27/06* | (2006.01) |
  | *B32B 19/00* | (2006.01) |
  | *B32B 9/00* | (2006.01) |
  | *C04B 35/622* | (2006.01) |
  | *B28D 1/22* | (2006.01) |

(52) U.S. Cl.
CPC ............... *B32B 3/02* (2013.01); *C04B 2235/94* (2013.01); *C04B 35/622* (2013.01); *C04B 2235/612* (2013.01); *B28D 1/222* (2013.01); *C04B 2235/6022* (2013.01); *C04B 2235/6025* (2013.01)
USPC ....... 428/66.6; 428/473.5; 428/480; 428/688; 428/689; 428/702

(58) Field of Classification Search
CPC .......................... H06K 1/0306; C04B 35/622
USPC ............... 428/473.5, 480, 688, 689, 702, 704
See application file for complete search history.

(56) References Cited

U.S. PATENT DOCUMENTS 4,473,735 A * 9/1984 Steffen ..................... 219/121.66

FOREIGN PATENT DOCUMENTS

| JP | 1995-15137 A | 1/1995 | |
|---|---|---|---|
| JP | 1996-46320 A | 2/1996 | |
| JP | 1996-208356 A | 8/1996 | |
| JP | 09117910 A * | 5/1997 | .............. B28B 11/14 |

(Continued)

OTHER PUBLICATIONS

McCue, "The basics and benefits of modern deburring" The Fabricator, 2010, p. 1-6.*

(Continued)

*Primary Examiner* — Prashant J Khatri
*Assistant Examiner* — Travis Figg
(74) *Attorney, Agent, or Firm* — Shumaker, Loop & Kendrick, LLP

(57) ABSTRACT

A cut-out sintered ceramic sheet including a side surface, the entire surface of which is a fracture surface having reliefs, wherein a plastic resin film is adhered onto upper and lower surfaces of the cut-out sintered ceramic sheet.

4 Claims, 11 Drawing Sheets

(56) References Cited

FOREIGN PATENT DOCUMENTS

| JP | 2001-210931 | A |   | 8/2001 |
| --- | --- | --- | --- | --- |
| JP | 2004-217480 | A |   | 8/2004 |
| JP | 2007149847 |   | * | 6/2007 |
| JP | 2007149847 | A | * | 6/2007 |

OTHER PUBLICATIONS

Machine Translation of JP 09-117910 A.*
Machine Translation of JP 2007-149847 A.*
Notice of Reasons of Refusal dated Dec. 19, 2011 for Japanese Patent Application No. 2011-248110.

* cited by examiner

CUT-OUT SINTERED CERAMIC SHEET AND METHOD OF MANUFACTURING THE SAME

CROSS-REFERENCE TO RELATED APPLICATIONS

This application is a divisional of U.S. application Ser. No. 13/649,454 filed Oct. 11, 2012, which claims priority of Japanese Patent Application Serial No. JP2011-248110 filed Nov. 11, 2011 and International Patent Application Serial No. PCT/JP2012/004604 filed Jul. 19, 2012, all of which are incorporated herein by reference.

TECHNICAL FIELD

The present invention relates to a cut-out sintered ceramic sheet, and to a method of obtaining a cut-out sintered ceramic sheet manufactured according to a method including a first step of forming a ceramic green sheet, and a second step of sintering the formed ceramic green sheet.

BACKGROUND ART

In recent years, sintered ceramic sheets have become widely used in electronic appliances such as cell phones and personal computers due to their superior properties. Such cut-out sintered ceramic sheets can be processed into various shapes to make further use of their superior properties.

One known shape-processing method for a sintered ceramic sheet includes processing the sheet into a desired shape at the ceramic green sheet stage. A sintered ceramic sheet obtained by this method produces a processed shape based on a shrinkage factor of the ceramic green sheet expected during the course of sintering. Typically, as shown in FIG. 11, when a ceramic green sheet 11 is sintered, the sintered ceramic sheet 12 shrinks be about 20%. One problem is that a difference can occur between the designed size calculated included the shrinkage factor, and the actual size of the sintered ceramic sheet obtained.

One solution to this problem is thus to process the sintered ceramic sheet after sintering. For example, Japanese Patent Application Publication No. 2002-359317 discloses procedures to obtain a cut-out sintered ceramic sheet of desired dimensions by performing a laser process and a dicing process on the sintered ceramic sheet.

A disadvantage of dicing is that dicing requires that the rotary knife directly contact the sintered ceramic sheet during cutting, making it impossible to process the sintered ceramic sheet into complex shapes. A disadvantage of laser processing is that heat is generated at the point of the laser focus, which can change the properties of the cut-out sintered ceramic sheet. Further, since longer time is required to process a complex shape, production efficiency decreases, and processing costs increase.

To overcome the disadvantages of the prior art processes, the present invention provides a procedure by which a sintered ceramic sheet can be processed quickly into a complex shape, and a cut-out sintered ceramic sheet can be obtained with very high dimensional accuracy.

BRIEF SUMMARY OF THE INVENTION

In one aspect, the present invention provides a method for producing a cut-out sintered ceramic sheet with high dimensional accuracy including the steps of forming a ceramic green sheet, sintering the formed ceramic green sheet, and cutting the sintered ceramic green sheet using a cutting module, such as a die.

In another aspect, the method uses a ceramic green sheet as a raw material and is capable of rapidly manufacturing a cut-out sintered ceramic sheet having an outer shape and/or inner shape that are smaller than a planar shape of a sintered ceramic sheet obtained by sintering the ceramic green sheet, and with high dimensional accuracy.

In another aspect, a method for manufacturing a cut-out sintered ceramic sheet includes a first step of obtaining a formed ceramic green sheet by forming the ceramic green sheet, a second step of obtaining a sintered ceramic sheet by sintering the formed ceramic green sheet, a third step of obtaining a film-adhered ceramic sheet by adhering a plastic resin film onto which adhesive is applied on at least one surface of the sintered ceramic sheet, and a fourth step of shearing the film-adhered ceramic sheet. By employing such a procedure, since the sintered ceramic sheet is sheared instead of the formed ceramic green sheet, no dimensional deformation is exhibited. Since a distance along which a cutting module is moved is short, the sintered ceramic sheet can quickly be cut.

In another aspect, the fourth step may include shearing the film-adhered ceramic sheet between the edges of upper and lower dies.

In another aspect, the fourth step may include directly or indirectly pressing the film-adhered ceramic sheet by the first or second pressing module against the contacting surfaces of the upper and lower dies, and shearing the film-adhered ceramic sheet between the edges provided on contacting surfaces of the upper and lower dies.

In another aspect, the fourth step may include a first substep of sandwiching the film-adhered ceramic sheet between the upper die and the second pressing module, juxtaposing the lower die to the second pressing module, and providing clearance between the edges of the upper and lower dies, and a second substep of shearing the film-adhered ceramic sheet by moving the upper and lower dies up and down relative to one another.

In another aspect, the fourth step may include a first substep of sandwiching the film-adhered ceramic sheet between the lower die and the first pressing module, juxtaposing the upper die to the first pressing module, and providing clearance between the edges of the upper and lower dies, and a second substep of shearing the film-adhered ceramic sheet by moving the upper and lower dies up and down relative to one another.

In another aspect, the fourth step may include a first substep of sandwiching the film-adhered ceramic sheet between the upper die and the second pressing module, juxtaposing the first pressing module to the upper die, and the lower die to the second pressing module, and providing clearance between edges of the upper and lower dies, and a second substep of shearing the film-adhered ceramic sheet by moving the upper and lower dies up and down relative to one another.

The cut-out sintered ceramic sheet may include a side surface, the entire surface of which is a fracture surface having reliefs.

In another aspect, a plastic resin film may be adhered onto at least one of the upper and lower surfaces of the cut-out sintered ceramic sheet.

In another aspect, the plastic resin film covering one of the upper and lower surfaces may extend to an end portion of the cut-out sintered ceramic sheet, and may be adhered up to the end portion.

According to the present invention, it becomes possible to manufacture a cut-out sintered ceramic sheet with a complex shape having superior dimensional accuracy at a very high production efficiency.

DESCRIPTION OF THE EMBODIMENTS

Figure 12:
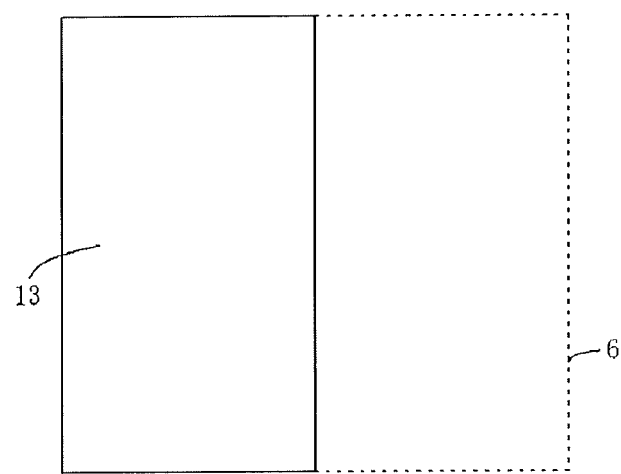
FIG. 12 shows a cut-out sintered ceramic sheet according to a first embodiment.

In the description that follows, a cut-out sintered ceramic sheet refers to a piece of sintered ceramic sheet obtained by cutting a sintered ceramic sheet into smaller areas. Specifically, FIG. 12 shows a cut-out sintered ceramic sheet 13 with a small area obtained by shearing a larger sintered ceramic sheet 6.

Figure 1:
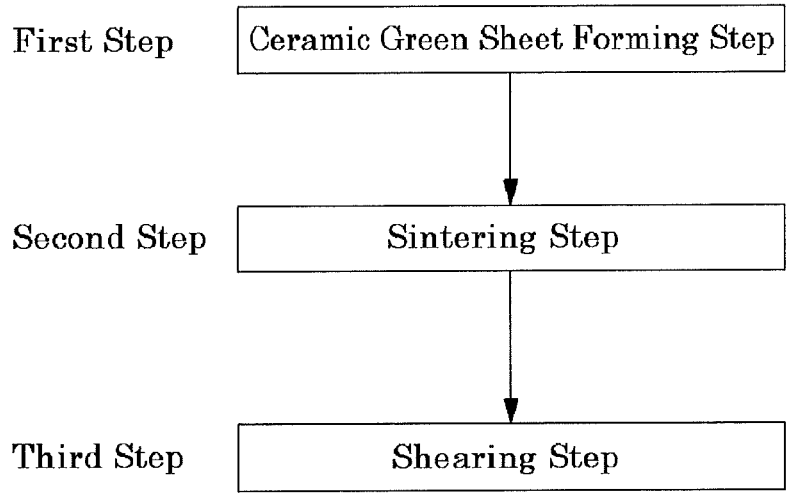
FIG. 1 shows a step of manufacturing a cut-out sintered ceramic sheet.

As shown in FIG. 1, a manufacturing process of the cut-out sintered ceramic sheet includes the following steps:

(1) Ceramic green sheet forming step including forming a ceramic green sheet by a doctor blade method, an injection method and the like, and thereafter cutting it into an appropriate size;

(2) Sintering step including obtaining a sintered ceramic sheet by sintering the obtained ceramic green sheet in the first step in a sintering furnace at an appropriate temperature; and (3) Shearing step including obtaining a cut-out sintered ceramic sheet by shearing the obtained sintered ceramic sheet into a desired shape.

Figure 22:
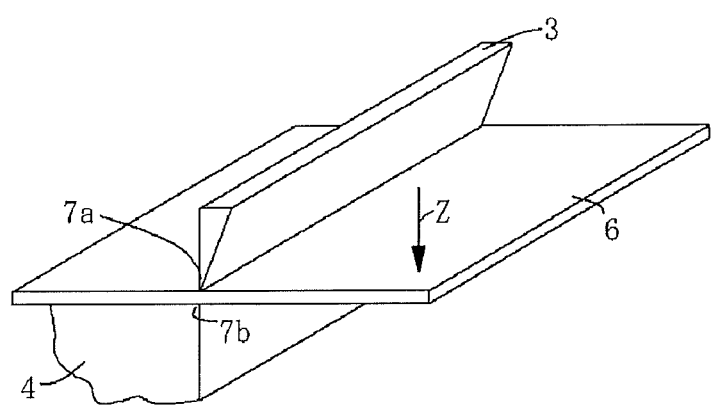
FIG. 22 is a partial perspective diagram of a sintered ceramic sheet before shearing.

As shown in FIG. 22, as principles of a shearing method, firstly the sintered ceramic sheet 6 is mounted on a lower die 4 having an edge 7b, and then an upper die 3 having an edge 7a is lowered in a Z direction.

Figure 2:
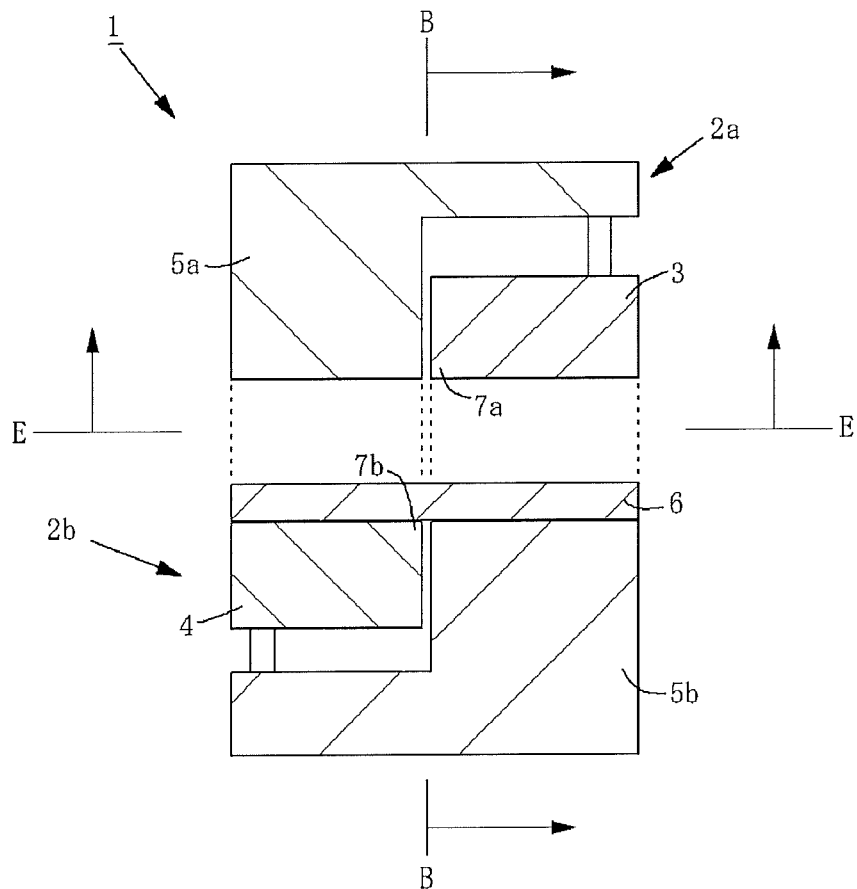
FIG. 2 is a partial cross-sectional diagram of a shearing device when a sintered ceramic sheet is set.

In order to shear the sintered ceramic sheet 6, a shearing device 1 as shown in FIG. 2 is used. The shearing device 1 includes an upper-side die 2a and a lower-side die 2b. As in FIG. 2, the upper-side die 2a includes the upper die 3 and a first pressing module 5a. The lower-side die 2b includes the lower die 4 and a second pressing module 5b. A bottom surface of the upper die 3 and an upper surface of the second pressing module 5b have a desired shape to be obtained when the sintered ceramic sheet 6 is sheared. The lower die 4 and the first pressing module 5a are juxtaposed to the second pressing module 5b and the upper die 3, respectively. That is, the upper die 3 and the lower die 4 are diagonally arranged. Further, the upper die 3 and the lower die 4 have the edges 7a, 7b, respectively that are substantially at a right angle. The angle of the edges improves as the angle moves toward a right angle.

Figure 3:
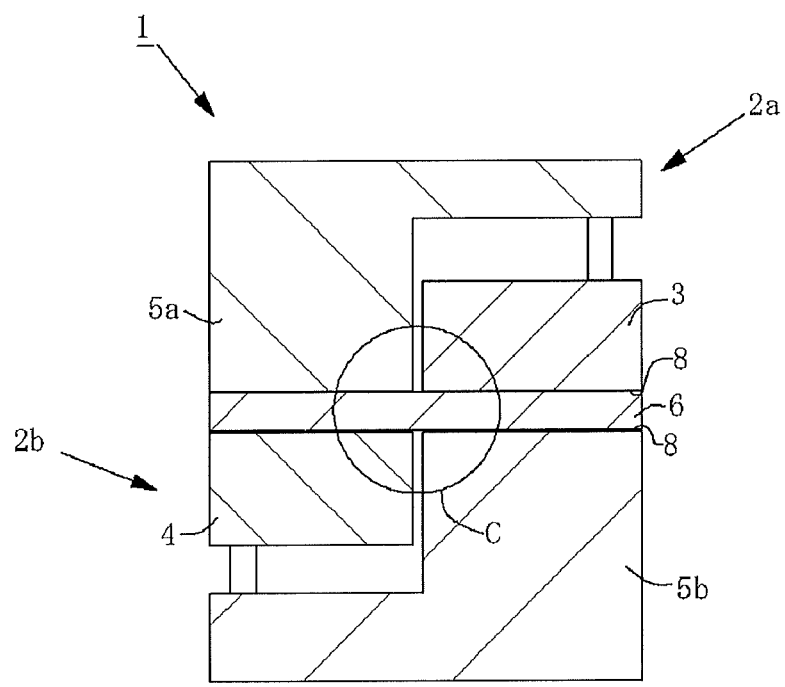
FIG. 3 is a partial cross-sectional diagram of the shearing device before shearing the sintered ceramic sheet.

As shown in FIG. 3, the sintered ceramic sheet 6 is set between the upper-side die 2a and the lower-side die 2b, and the sintered ceramic sheet 6 is directly pressed by a contacting surface 8 of the upper die 3 and a contacting surface 8 of the second pressing module 5b, and fixed thereby. The contacting surface refers to a surface by which the upper die 3, the lower die 4, the first pressing module 5a, or the second pressing module 5b makes contact with the sintered ceramic sheet 6. Accordingly, by pressing the sintered ceramic sheet 6 by the second pressing module 5b and fixing the same thereby, since warpage in the sintered ceramic sheet 6 upon shearing the sintered ceramic sheet 6 is prevented, dimensional accuracy can be improved.

Figure 4:
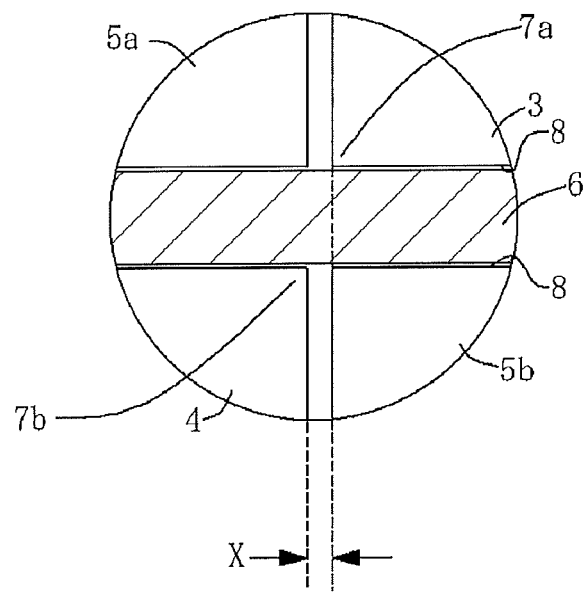
FIG. 4 is an enlarged cross-sectional diagram of a C portion of FIG. 3.

Next, the lower die 4 is juxtaposed to the second pressing module 5b. At this occasion, as shown in FIG. 4, a predetermined clearance X is provided between the upper die 3 and the lower die 4. The clearance X refers to a gap formed between the upper die 3 and the lower die 4 upon performing the shearing.

Figure 5:
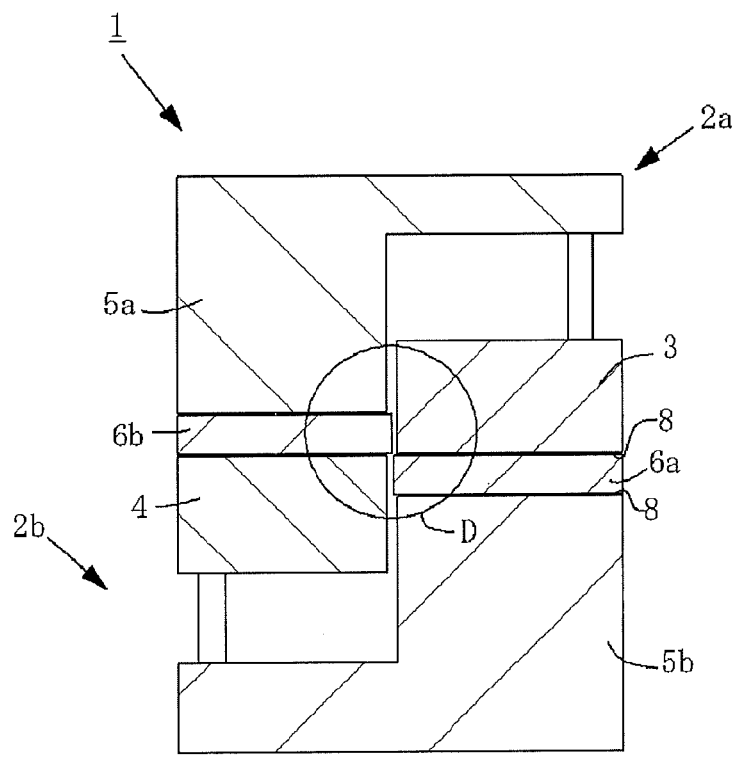
FIG. 5 is a partial cross-sectional diagram of the shearing device after having sheared the sintered ceramic sheet.
Figure 6:
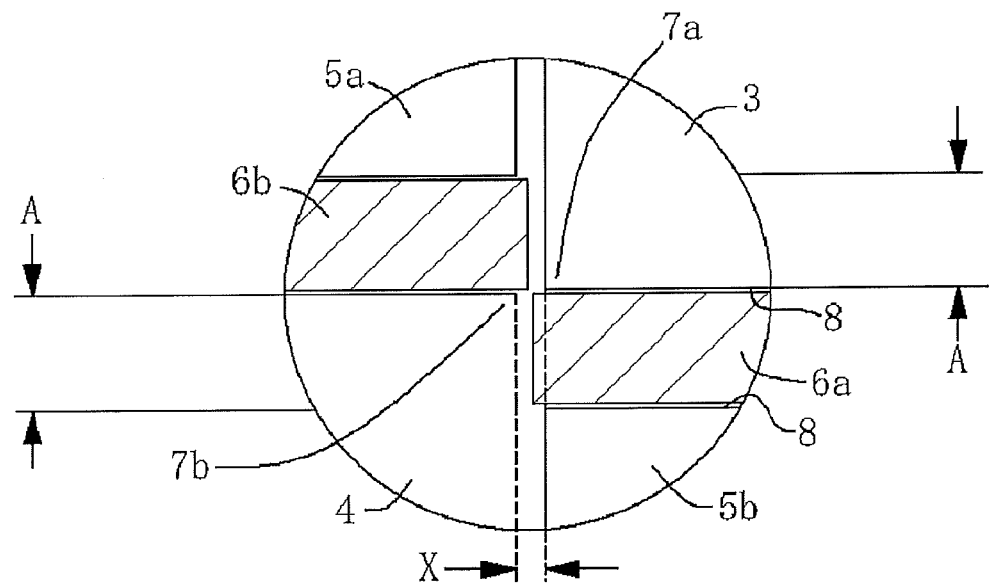
FIG. 6 is an enlarged cross-sectional diagram of a D portion of FIG. 5.
Figure 7:
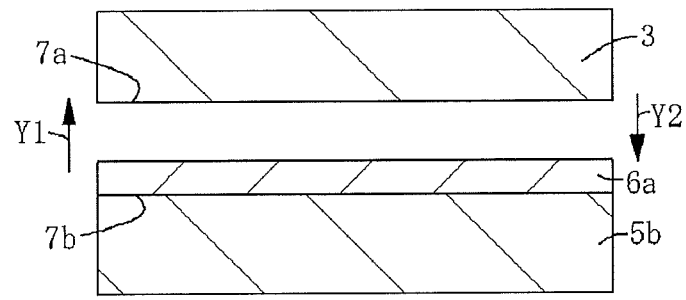
FIG. 7 is a diagram taken along an arrow B-B of FIG. 2.

Then, as shown in FIGS. 5 and 6, when the upper die 3 and the lower die 4 are relatively moved up and down, the sintered ceramic sheet 6 is sheared between the upper die edge 7a and the lower die edge 7b, and can be formed into the desired shape. Relatively moving up and down may mean to lower the upper die 3, to raise the lower die 4, or to move the upper die 3 and the lower die 4 simultaneously. In this case, as shown in FIG. 6, a distance A by which the dies are moved must at least be a distance equal to or more than a thickness of the sintered ceramic sheet 6. Further, a portion 6b that is not included in the desired shape of the sintered ceramic sheet 6 may be sandwiched by the lower die 4 and the first pressing module 5a and fixed thereby, and after having juxtaposed the upper die 3 to the first pressing module 5a, the upper die 3 and the second pressing module 5b may be displaced up and down so that the sintered ceramic sheet 6 is sheared between the edges of the upper die 3 and the lower die 4 to be formed into the desired shape. Further, when the shearing is performed by having fixed the cut-out sintered ceramic sheet 6a by the upper die 3 and the second pressing module 5b, and in addition having fixed the portion 6b that is not included in the desired shape by the lower die 4 and the first pressing module 5a, due to substantially an entire surface of the sintered ceramic sheet being fixed, the cutting can be performed with the best dimensional accuracy. Further, as in FIG. 7, when the cutting is performed along a B-B section in FIG. 2 and seen in a direction of an arrow, since the sintered ceramic sheet 6 is sheared between the edges of the upper die 3 and the lower die 4 so as to be torn in an up and down (Y1, Y2) direction, the cut-out sintered ceramic sheet 6a comes to have the desired shape at the same time as being subjected to the shearing.

When such a shearing device 1 is used, the sintered ceramic sheet 6 can quickly be processed into a complex shape, and in addition the cut-out sintered ceramic sheet 6a can be obtained with a very high dimensional accuracy. Further, the upper and lower side dies 2a and 2b of the shearing device 1 employ a mechanism wherein each upper die 3 and lower die 4 are moved up and down by a predetermined load, e.g. conventional lifting mechanisms such as hydraulic lifting or mechanical lifting. Further, the contacting surfaces of the pressing modules 5a and 5b positioned in the upper and lower side dies 2a and 2b may be made with the same material as the contacting surface of the upper and lower dies 3 and 4 (e.g. steel). Moreover, a processing condition of the shearing device such as a load, may be designed by those skilled in the art depending on a thickness, material, or size of the ceramic sheet.

Figure 8:
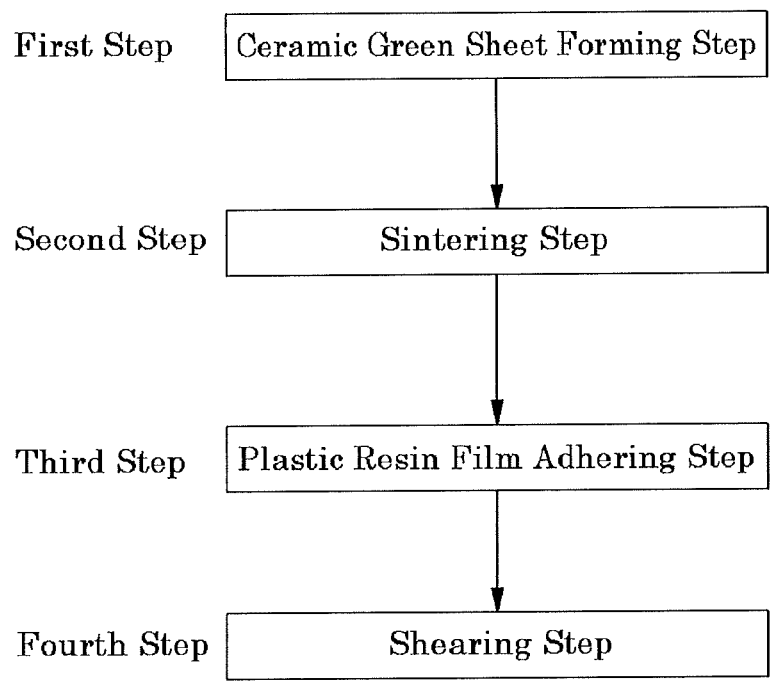
FIG. 8 shows another step of manufacturing the cut-out sintered ceramic sheet.
Figure 9:
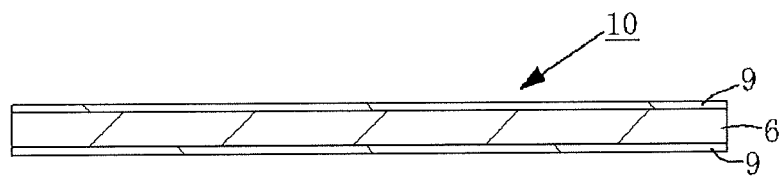
FIG. 9 is a cross-sectional diagram of a film-adhered ceramic sheet.
Figure 10:
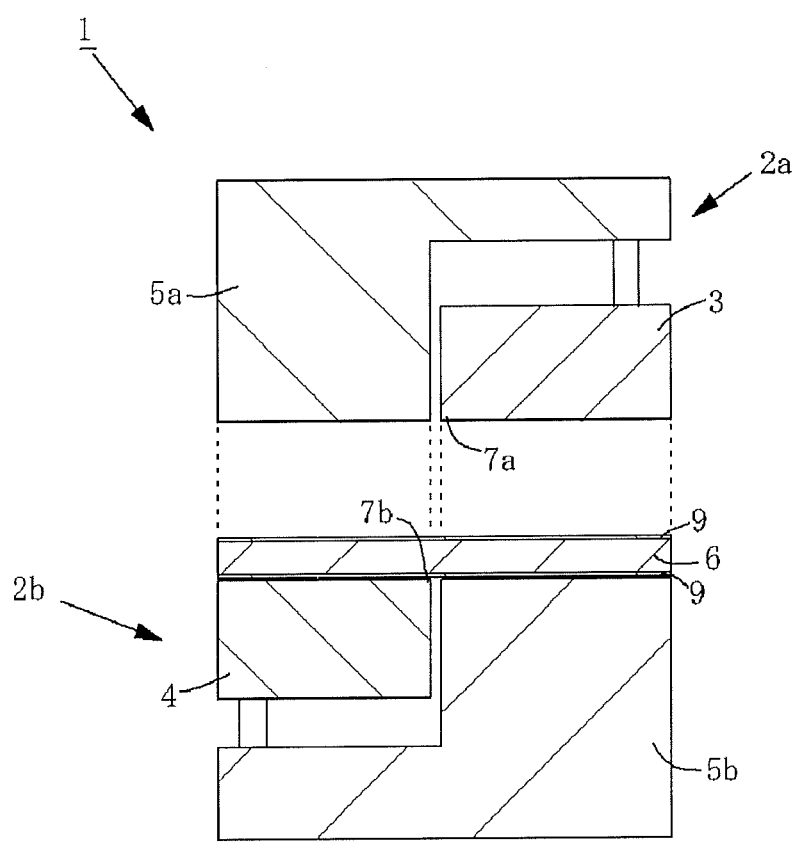
FIG. 10 is a partial cross-sectional diagram of the shearing device when the film-adhered ceramic sheet is set.
Figure 11:
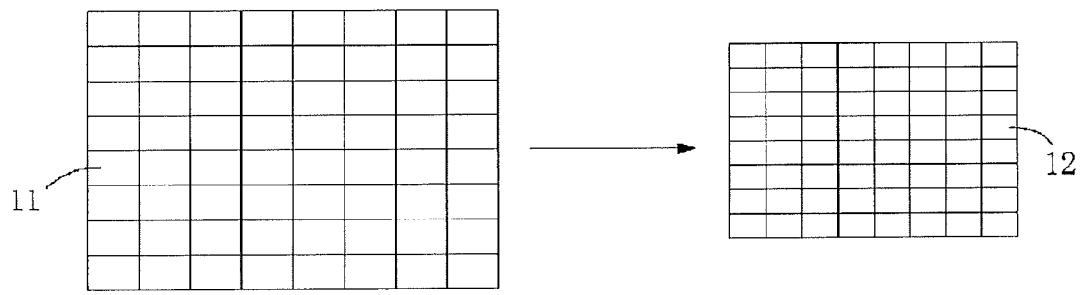
FIG. 11 is a diagram showing shrinkage states of a ceramic sheet before and after sintering.

Although the sintered ceramic sheet 6 can be sheared in the above method, it is vulnerable to breakage if the sintered ceramic sheet has projections thereon, since pressure accumulates at the protrusions. Due to this, as shown in FIG. 8, a plastic resin film adhering step is added. When plastic resin films 9 are adhered to the sintered ceramic sheet 6, a cross section thereof turns out to be as shown in FIG. 9, and a film-adhered ceramic sheet 10 is obtained. Although the film-adhered ceramic sheet 10 of FIG. 9 has the plastic resin films 9 on both surfaces of the sintered ceramic sheet 6, the plastic resin film 9 may be adhered only to one surface. When the plastic resin film 9 is adhered as described, the pressure directly exerted onto the sintered ceramic sheet 6 during the shearing is dispersed, and as a result, the sintered ceramic sheet 6 becomes resistive to breakage at portions other than the desired shearing portion. Accordingly, as in FIG. 10, when the film-adhered ceramic sheet 10 is set on the shearing device 1 and the film-adhered ceramic sheet 10 is subjected to the shearing similar to the above method, a cut-out sintered ceramic sheet 6a with further improved dimensional accuracy can be obtained.

It is preferred that the clearance X in shearing the film-adhered ceramic sheet is substantially 5-50 μm. In other words, a clearance X of substantially 5-50 μm reduces the occurrence of large burrs on the fracture surface or deformation of the end edge of the fracture surface of the ceramic sheet, and therefore allows a shearing process with finer and higher dimensional accuracy. Further, when the sintered ceramic sheet 6 (namely, the film-adhered ceramic sheet 10) to which the plastic resin film 9 adheres is sheared with the clearance X, both the sintered ceramic sheet 6 and the plastic resin film 9 are fractured along the fracture surface. As a result, the plastic resin film 9 adheres up to the edge of the cut-out sintered ceramic sheet 6a. However, those skilled in the art may optionally design the clearance X, so the technical scope of the present invention is not limited.

The material for the sintered ceramic sheet of the present embodiments may be selected from the following group: alumina, zirconia, magnesia, titania, silica, aluminum nitride, silicon nitride, silicon carbide, ferrite, cordierite and mullite. The plastic film of the present embodiments may include polyester, polyimide, polyimide varnish, epoxy resin and metallic foil such as copper, aluminum and SUS. Further, the adhesive for adhering the plastic film onto the sintered ceramic sheet may be selected from acrylic adhesive, silicon adhesive and epoxy pressure sensitive adhesive, and such. However, the technical scope of the present invention is not limited to the above materials and those skilled in the art may select the materials appropriately.

Example 1

Figure 13:
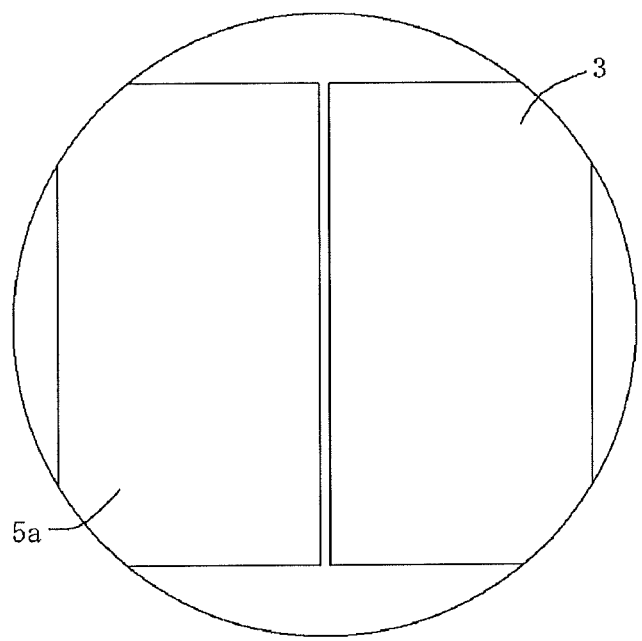
FIG. 13 is a diagram taken along an arrow E-E of FIG. 2 in the first embodiment.

As a first embodiment, FIG. 12 is an embodiment of the cut-out sintered ceramic sheet obtained by using the present invention. As shown in FIG. 13, when the upper-side die 2a is seen from just below, the upper die 3 and the pressing module 5a are adjacent to one another. On the other side, when the lower-side die 2b is seen from just above, the upper die 3 of FIG. 13 has the same shape to correspond to the second pressing module 5b, and the first pressing module 5a has the same shape to correspond to the lower die 4. When such an upper-side die 2a and a lower-side die 2b are prepared, and the sintered ceramic sheet 6 is sheared in the manufacturing process shown in FIGS. 1 and 8, the cut-out sintered ceramic sheets 13 that are sheared into two pieces can be obtained.

Example 2

Figure 14:
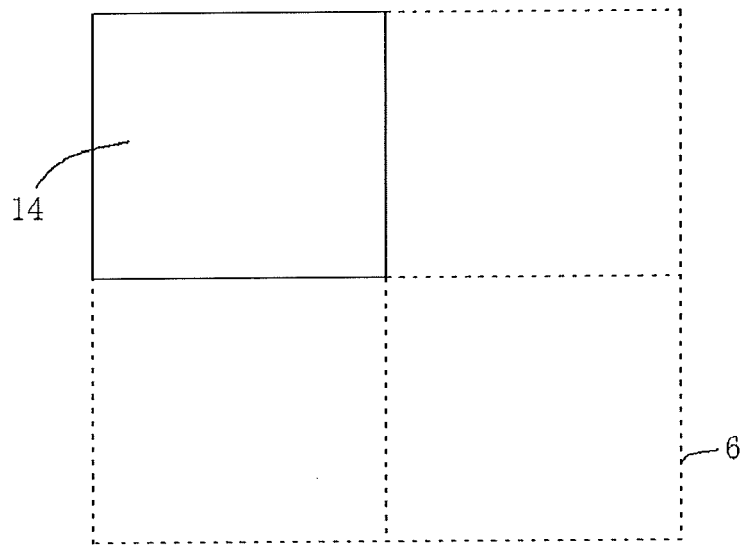
FIG. 14 shows a cut-out sintered ceramic sheet according to a second embodiment.
Figure 15:
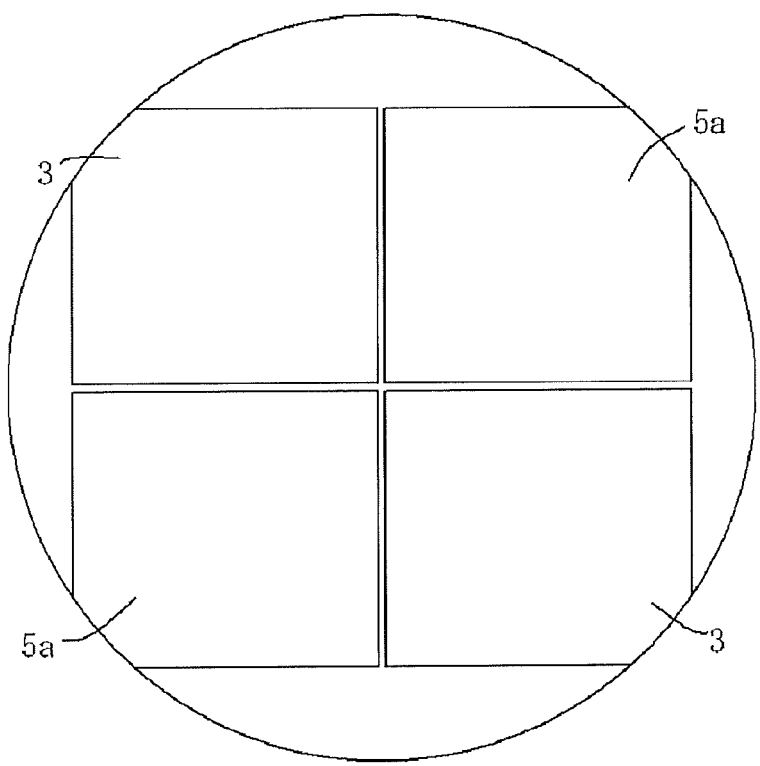
FIG. 15 is a diagram taken along the arrow E-E of FIG. 2 in the second embodiment.

As a second embodiment, FIG. 14 is another embodiment of a cut-out sintered ceramic sheet obtained by using the present invention. As shown in FIG. 15, when an upper-side die 2a is seen from just below, upper dies 3 and first pressing modules 5a are positioned adjacent to one another, and the upper dies 3 are arranged diagonal to one another and the first pressing modules 5a are arranged diagonal to one another. On the other hand, as of a lower-side die 2b, when seen from just above, the upper dies 3 of FIG. 15 have the same shape to correspond to second pressing modules 5b, and the first pressing modules 5a have the same shape to correspond to lower dies 4. When such an upper-side die 2a and a lower-side die 2b are prepared, and the sintered ceramic sheet 6 is sheared in the manufacturing process shown in FIGS. 1 and 8, cut-out sintered ceramic sheets 14 that are sheared into four pieces can be obtained.

Example 3

Figure 16:
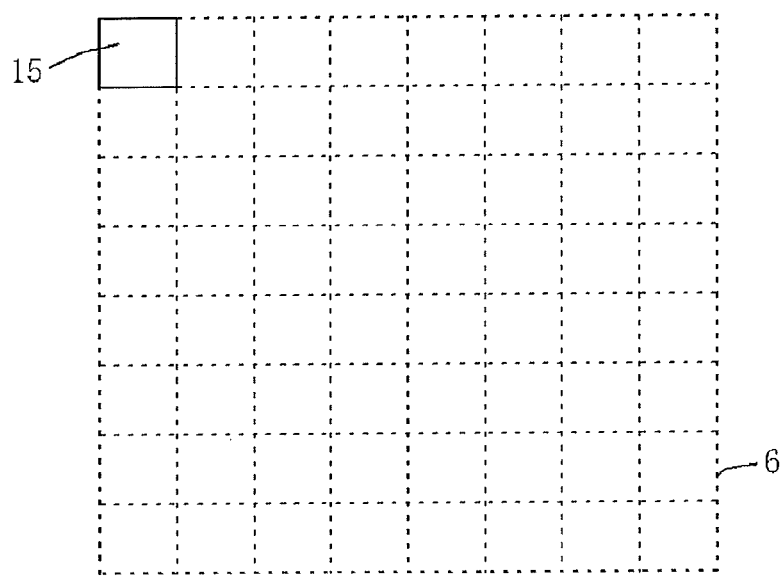
FIG. 16 shows a cut-out sintered ceramic sheet according to a third embodiment.

As a third embodiment, FIG. 16 is another embodiment of a cut-out sintered ceramic sheet obtained by using the present invention. When an upper-side die 2a is seen from just below, similar to the second embodiment, upper dies 3 and first pressing modules 5a are positioned adjacent to one another, the upper dies 3 are arranged diagonal to one another, the first pressing modules 5a are arranged diagonal to one another, and further, this shape is connected in a grid manner. Similar to the first embodiment, a lower-side die 2b has the same shape in which the upper dies 3 correspond to second pressing modules 5b, and the first pressing modules 5a correspond to lower dies 4. When such an upper-side die 2a and a lower-side die 2b are prepared, and the sintered ceramic sheet 6 is sheared in the manufacturing step shown in FIGS. 1 and 8, cut-out sintered ceramic sheets 15 that are sheared into a plurality of pieces are obtained.

Example 4

Figure 17:
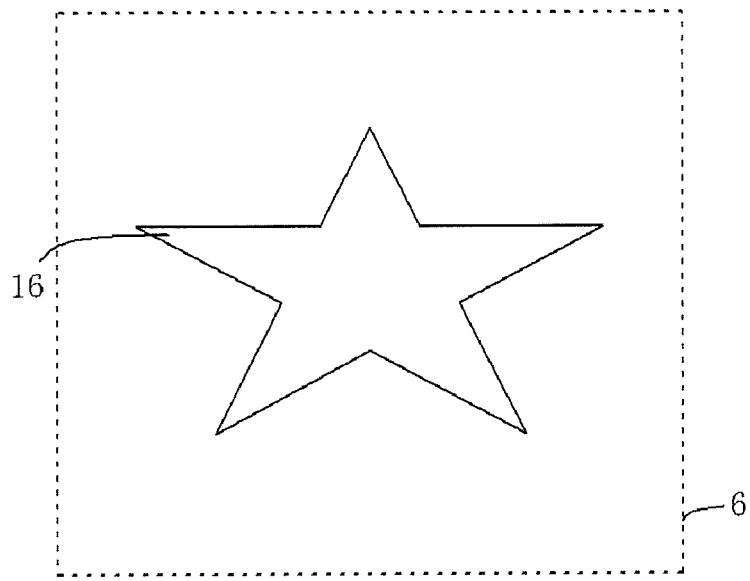
FIG. 17 shows a cut-out sintered ceramic sheet according to a fourth embodiment.
Figure 18:
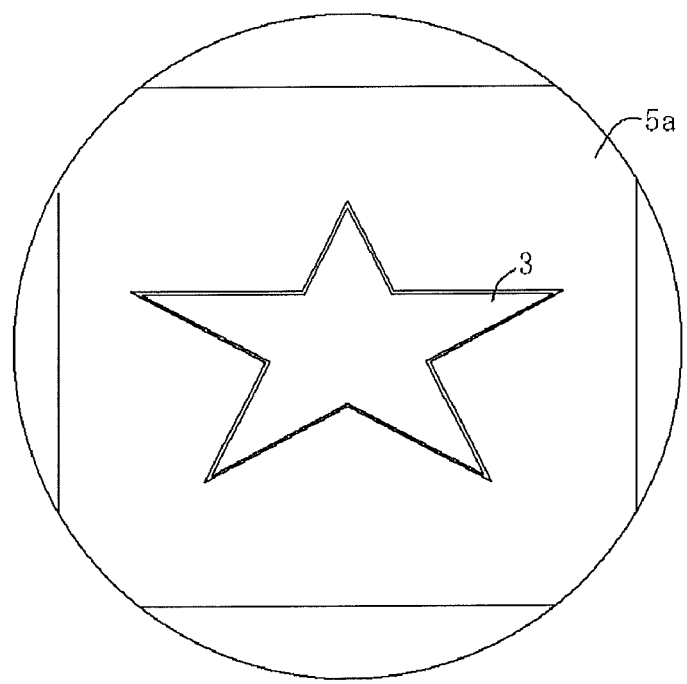
FIG. 18 is a diagram taken along the arrow E-E of FIG. 2 in the fourth embodiment.

As a fourth embodiment, FIG. 17 is another embodiment of a cut-out sintered ceramic sheet obtained by using the present invention. As shown in FIG. 18, when an upper-side die 2a is seen from just below, an upper die 3 has a star-shaped portion, and a first pressing module 5a has a portion other than the star-shaped portion. On the other hand, when a lower-side die 2b is seen from just above, a second pressing module 5b is the star-shaped portion, and a lower die 4 is the portion other than the star-shaped portion. When such an upper-side die 2a and a lower-side die 2b are prepared and the sintered ceramic sheet 6 is sheared in the manufacturing process as shown in FIGS. 1 and 8, a star-shaped cut-out sintered ceramic sheet 16 is obtained. In other words, each edge of the contacting surface of the upper die 3 (or the second pressing module 5b) and the lower die 4 (or the first pressing module 5a) has the same shape as the desired shape on the cut-out sintered ceramic sheet (namely, a star shape). Accordingly, in the shearing process above, the star-shaped cut-out sintered ceramic sheet 16 is sheared off from the sintered ceramic sheet 6 (or the film-adhered ceramic sheet 10) along the edge. Then, one film-adhered ceramic sheet 10 (or the sintered ceramic sheet 6) is separated into the desired-shaped (namely, star-shaped) cut-out sintered ceramic sheet 16 and the rest of the outer portion. In this way, a desired-shaped cut-out sintered ceramic sheet can be obtained by optionally setting the shape of the upper and lower dies. Furthermore, since a margin which is the outer portion of the cut-out sintered ceramic sheet is sheared off in a single shearing process, the cut-out sintered ceramic sheet can be rapidly and accurately produced. In addition, providing the upper-side die 2a and the lower-side die 2b with a plurality of separated upper and lower dies 3, 4 allows that a plurality of desired-shaped cut-out sintered ceramic sheets to be sheared off from a single film-adhered ceramic sheet 10 in a single shearing process.

Example 5

Figure 19:
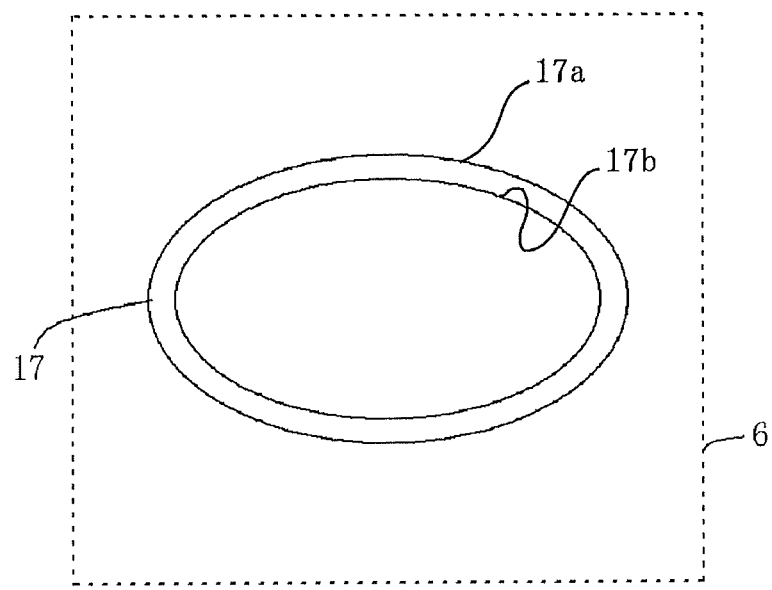
FIG. 19 shows a cut-out sintered ceramic sheet according to a fifth embodiment.
Figure 20:
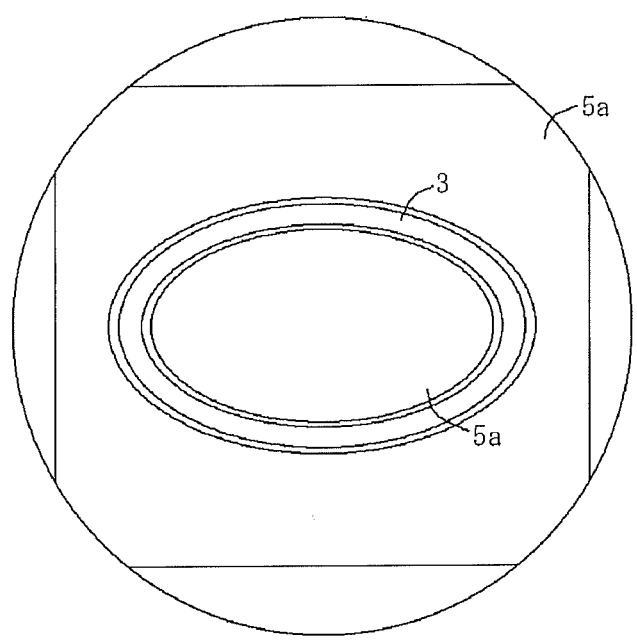
FIG. 20 is a diagram taken along the arrow E-E of FIG. 2 in the fifth embodiment.

As a fifth embodiment, FIG. 19 is another embodiment of a cut-out sintered ceramic sheet obtained by using the present invention. As shown in FIG. 20, when an upper-side die 2a is seen from just below, an upper die 3 has a doughnut-shaped portion, and a first pressing module 5a has portions other than the doughnut-shaped portion. On the other hand, when a lower-side die 2b is seen from just above, a second pressing module 5b is the doughnut-shaped portion, and a lower die 4 is the portions other than the doughnut-shaped portion. When such an upper-side die 2a and a lower-side die 2b are prepared and the sintered ceramic sheet 6 is sheared in the manufacturing process as shown in FIGS. 1 and 8, a doughnut-shaped cut-out sintered ceramic sheet 17a is obtained. In other words, the upper die 3 has an annular contacting surface with inner and outer edges. Two cut-out sintered ceramic sheets are sheared off from the film-adhered ceramic sheet 10 along the inner and outer edges. That is, one film-adhered ceramic sheet 10 (or the sintered ceramic sheet 6) is separated into the first annular cut-out sintered ceramic sheet 17a which has inner and outer side surfaces corresponding to the inner and outer edges, the second annular cut-out sintered ceramic sheet 17b which has an outer side surface corresponding to the inner edge, and the rest of the outer portion. The first cut-out sintered ceramic sheet 17a has the fracture surface of the entire inner and outer side surfaces obtained in the shearing process. On the other hand, the second cut-out sintered ceramic sheet 17b has the fracture surface of the entire outer side surface obtained in the shearing process and is usable as a high-accuracy part similar to the first cut-out sintered ceramic sheet. In this manner, designing to further provide another independent shearing site on the inside of the cut-out sintered ceramic sheet allows obtaining not only the margin which is the outer portion of the cut-out sintered ceramic sheet but also the cut-out sintered ceramic sheet wherein the inside is cut out from the desired shape. That is, as indicated in Example 5, even a cut-out sintered ceramic sheet in a complex shape which has two or more independent sheared surfaces can be produced in a single shearing process. It is also possible to divide the process into separate processes to form two sheared surfaces with a differently-timed operation.

Accordingly, by using the present invention, the sintered ceramic sheet 6 can be formed into the cut-out sintered ceramic sheet having various shapes simply by changing shapes of the upper-side die 2a and the lower-side die 2b. In Examples 1-5, the clearance X is set as substantially 10 μm. A squared ferrite slab of substantially 100 mm on a side and 170 μm in thickness is employed for the sintered ceramic sheet 6 of the present embodiment. Further, a polyimide sheet of substantially 30 μm in thickness is employed for the plastic resin film. However, processing conditions of the shearing device, and/or, the shape, size and material may be optionally designed by those skilled in the art depending on the usage of the cut-out sintered ceramic sheet.

Figure 21:
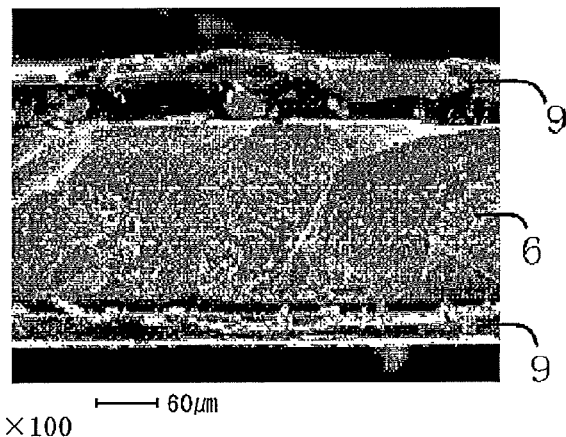
FIG. 21 is an SEM image of a fracture surface of a film-adhered ceramic sheet.

A side surface of the cut-out sintered ceramic sheet obtained by the above methods is a fracture surface including reliefs at its entire surface as shown in FIG. 21. The fracture surface is a surface that is cut out after the sintering and that does not include any marks of processing. Since the side surface is not processed, the side surface comes to be a surface having the reliefs instead of being flat. The image in FIG. 21 is taken through a scanning electron microscope (SEM) with 100× magnification.

Since the fracture surface is not processed, the sintered state of the fracture surface does not change, thus the properties thereof do not change. That is, the sintered state of the cut-out sintered ceramic sheet obtained in the shearing process is uniform both in the fracture surface having the reliefs and the other portion. For example, when a laser process is performed, the properties may deteriorate due to the sintered state of the side surface changed by heat.

The cut-out sintered ceramic sheet may have the plastic resin film 9 adhered at least on one surface of the upper and lower surfaces. That plastic resin film 9 is adhered to one of the surfaces of the upper and lower surfaces up to an end portion.

The above characteristics are achieved by the manufacturing method of the present invention. For example, when the film-adhered ceramic sheet 10 is laser processed, the cut-out sintered ceramic sheet after the processing may have the end portion of the plastic resin film 9 melted or deformed by the heat, whereby the end portion of the cut-out sintered ceramic sheet may not be covered completely by the plastic resin film 9. Further, when the film-adhered ceramic sheet 10 is subjected to a dicing process, when a rotary knife rotating at high speed cuts ceramic, the plastic resin film 9 may be deformed at the same time, so the end portion of the cut-out sintered ceramic sheet may not be covered completely by the plastic resin film 9, similar to the case of the laser process. Accordingly, when pressure is exerted from outside to a portion that is not covered by the plastic resin film 9, the cut-out sintered ceramic sheet breaks easily. Or, even if the plastic resin film is adhered onto the sintered ceramic sheet 6 after the sintered ceramic sheet 6 is cut in the dicing process, there is difficulty in adhering the plastic resin film 9 onto the sheet securely to avoid being out of alignment with the edge. This is likely to cause an exposed portion not covered by the plastic resin film 9. Similar to this case, when pressure is exerted from outside to a portion that is not covered by the plastic resin film 9, the cut-out sintered ceramic sheet breaks easily.

By using the present invention, the plastic resin film can be adhered fully up to the end portion of the cut-out sintered ceramic sheet, and the cut-out sintered ceramic sheet can be protected from outside pressure.

As described above, the present invention has very good dimensional accuracy since it processes the sintered ceramic sheet after the sintering. Further, simply by shearing the sintered ceramic sheet using the die, the sintered ceramic sheet can be formed into the desired shape, thus the cut-out sintered ceramic sheet can be produced quickly and efficiently. More specifically, in the method of manufacturing a cut-out sintered ceramic sheet in the embodiments, the sintered ceramic sheet is sheared by sandwiching and fixing one side of the sintered ceramic sheet with the contact surface of the upper die and the contact surface of the second pressing module, and at the same time, sandwiching and fixing the other side of the sintered ceramic sheet with the contact surface of the lower die and the contact surface of the first pressing module, and then relatively displacing the upper and lower die with the predetermined load. This prevents a localized and momentary strong stress (warpage) and an impact generated in shearing at the shearing position or in proximity thereof, and therefore prevents brittle fracture on the fracture surface of the cut-out sintered ceramic sheet. That is, the method of manufacturing the cut-out sintered ceramic sheet in the present invention has an advantage of reducing burrs or cracks on the fracture surface of the cut-out sintered ceramic sheet.

The invention has been described in an illustrative manner. It is to be understood that the terminology, which has been used, is intended to be in the nature of words of description rather than limitation. Many modifications and variations of the invention are possible in light of the above teachings. Therefore, within the scope of the appended claims, the invention may be practiced other than as specifically described.

What is claimed is:

1. A cut-out sintered ceramic sheet comprising a side surface, the entire surface of which is a fracture surface having reliefs and being free of burrs,
    wherein a plastic resin film is adhered onto upper and lower surfaces of the cut-out sintered ceramic sheet,
    wherein the fracture surface having reliefs is formed by shearing the sintered ceramic sheet onto which the plastic resin film is adhered and the fracture surface is uniform in properties with the other portions of the cut-out sintered ceramic sheet.

2. The cut-out sintered ceramic sheet according to claim 1, wherein the plastic resin film covering the upper and lower surfaces extends to an end portion of the cut-out sintered ceramic sheet, and is adhered to the end portion.

3. The cut-out sintered ceramic sheet according to claim 1, wherein the plastic resin film is selected from the group consisting of polyester, polyimide, polyimide varnish and epoxy resin.

4. The cut-out sintered ceramic sheet according to claim 1, comprising an annular shape wherein the fracture surface having the reliefs is formed on the entire inner and outer side surfaces of the cut-out sintered ceramic sheet.

* * * * *